(12) United States Patent
Lim et al.

(10) Patent No.: US 8,767,167 B2
(45) Date of Patent: Jul. 1, 2014

(54) DISPLAY PANEL AND METHOD OF MANUFACTURING THE SAME

(75) Inventors: Sung-Hoon Lim, Gunsan-si (KR);
Jung-Hwan Hwang, Asan-si (KR);
Seung-Ho Nam, Seongnam-si (KR);
Sam-Jin Hwang, Yongin-si (KR);
Jee-Hong Min, Seongnam-si (KR);
Jae-Ho Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 184 days.

(21) Appl. No.: 13/239,182

(22) Filed: Sep. 21, 2011

(65) Prior Publication Data

US 2012/0194451 A1    Aug. 2, 2012

(30) Foreign Application Priority Data

Feb. 1, 2011   (KR) ........................ 10-2011-0010018

(51) Int. Cl.
*G02F 1/13* (2006.01)
*G02F 1/1335* (2006.01)
*G06F 3/041* (2006.01)

(52) U.S. Cl.
USPC ........... 349/187; 349/12; 345/173; 178/18.01

(58) Field of Classification Search
CPC ..... G02F 1/13338; G06F 3/041; G06F 3/045; G06F 2203/04103

USPC .......... 349/12, 187; 345/173, 104; 178/18.01; 359/643

See application file for complete search history.

(56) References Cited

U.S. PATENT DOCUMENTS

| 7,379,136 | B2 * | 5/2008 | Yang et al. ..................... 349/114 |
| 2004/0189587 | A1 * | 9/2004 | Jung et al. ..................... 345/102 |
| 2008/0062139 | A1 * | 3/2008 | Hotelling et al. ............. 345/173 |
| 2010/0001976 | A1 * | 1/2010 | Jiang et al. .................... 345/174 |
| 2010/0007619 | A1 * | 1/2010 | Jiang et al. .................... 345/173 |
| 2010/0073310 | A1 * | 3/2010 | Liang et al. ................... 345/173 |
| 2011/0063239 | A1 * | 3/2011 | Xie et al. ....................... 345/173 |
| 2011/0115725 | A1 * | 5/2011 | Hwang et al. ................. 345/173 |
| 2012/0033168 | A1 * | 2/2012 | Hwang et al. ................. 349/139 |

* cited by examiner

*Primary Examiner* — Michael Caley
*Assistant Examiner* — Jia Pan
(74) *Attorney, Agent, or Firm* — Cantor Colburn LLP

(57) ABSTRACT

The display panel includes an opposite substrate and an array substrate. The opposite substrate includes a first substrate including a first surface and a second surface opposite to the first surface, a first wire electrode formed on the first surface, a first transparent electrode formed on the first surface and partially overlapping with the first wire electrode, and a common electrode formed on the second surface. The first wire on the first surface is formed before the first transparent electrode on the first surface. The array substrate includes a second substrate including a third surface facing the second surface, and a pixel layer formed on the third surface and facing the common electrode.

15 Claims, 6 Drawing Sheets

DISPLAY PANEL AND METHOD OF MANUFACTURING THE SAME

This application claims priority to Korean Patent Application No. 2011-0010018, filed on Feb. 1, 2011, and all the benefits accruing therefrom under 35 U.S.C. §119, the contents of which are herein incorporated by reference in their entireties.

BACKGROUND OF THE INVENTION

1. Field of the Invention

Exemplary embodiments of the invention relate to a display panel and a method of manufacturing the display panel. More particularly, exemplary embodiments of the invention relate to a display panel improving reliability and a method of manufacturing the display panel.

2. Description of the Related Art

A touch display panel including a touch panel directly inputting information on a screen using a finger or a pen has been developed. The touch panel is mounted on a conventional display panel, or a light sensing element, a pressure sensing element, etc. is formed in the conventional display panel, so that the touch display panel may be embodied.

When the touch panel is mounted on the conventional display panel, the conventional display panel includes an array substrate and an opposite substrate, and the touch panel includes a lower substrate having a first transparent electrode and an additional upper substrate having a second transparent electrode. Thus, when a touch occurs, the second transparent electrode makes contact with the first transparent electrode, so that a touched position may be detected by a current generated by a voltage drop. However, the touch display panel includes four substrates, so that a manufacturing cost and a thickness of the touch display panel may be increased.

To solve the above-mentioned problem, the touch display panel including the opposite substrate of the display panel on which the first transparent electrode is directly formed, instead of a separate lower substrate of the touch panel, has been developed.

However, when manufacturing the touch display panel including the opposite substrate of the display panel on which the first transparent electrode is previously directly formed, scratches of the formed first transparent electrode and a first wire electrode or cracks of the opposite substrate and the array substrate may be generated, in forming the first wire electrode electrically connected to the first transparent electrode or in assembling the opposite substrate with the array substrate. Thus, the reliability of the touch display panel may be reduced.

BRIEF SUMMARY OF THE INVENTION

Exemplary embodiments of the invention provide a display panel capable of improving reliability.

Exemplary embodiments of the invention also provide a method of manufacturing the display panel.

According to an exemplary embodiment of the invention, a display panel includes an opposite substrate and an array substrate. The opposite substrate includes a first substrate including a first surface, and a second surface opposite to the first surface, a first wire electrode on the first surface, a first transparent electrode on the first surface and partially overlapping with the first wire electrode, and a common electrode on the second surface. The first wire on the first surface is formed before the first transparent electrode on the first surface. The array substrate includes a second substrate including a third surface facing the second surface, and a pixel layer on the third surface and facing the common electrode.

In an exemplary embodiment, the first transparent electrode may be extended in a first direction. The first transparent electrode may be arranged in parallel in second direction crossing the first direction. At least one end of the first transparent electrode may be disposed on the first wire electrode to overlap with the first wire electrode.

In an exemplary embodiment, the display panel may further include a touch substrate including a third substrate including a fourth surface facing the first surface, and a second wire electrode and a second transparent electrode on the fourth surface and respectively facing the first wire electrode and the first transparent electrode.

In an exemplary embodiment, the third substrate may be a polarizer having a first polarizing axis.

In an exemplary embodiment, the opposite substrate may further include a spacer on the first transparent electrode and maintaining a constant gap between the first transparent electrode and the second transparent electrode.

According to another exemplary embodiment of the invention, a method of manufacturing the display panel is provided. In the method, a first wire electrode is formed on a first surface of a first substrate. A common electrode is formed on a second surface opposite the first surface of the first substrate. A pixel layer is formed on a third surface of a second substrate different than the first substrate and facing the second surface. The first substrate is assembled with the second substrate such that the third surface of the second substrate faces the second surface of the first substrate. A first transparent electrode partially overlapping with the first wire electrode on the first wire electrode is formed after the forming a first wire electrode.

In an exemplary embodiment, when the first wire electrode is formed, a wire electrode layer and a first photoresist layer may be sequentially formed on the first surface. The first photoresist layer may be developed. An exposed portion of the wire electrode layer may be etched to form the first wire electrode.

In an exemplary embodiment, the first wire electrode may include one of aluminium (Al) and copper (Cu). The exposed portion of wire electrode layer may be wet-etched.

In an exemplary embodiment, in the method, a first transparent electrode layer and a second photoresist layer may be sequentially formed on the first surface after forming the first wire electrode, and before the common electrode is formed.

In an exemplary embodiment, the second photoresist layer may overlap the first wire electrode and the first transparent electrode layer, to protect the first wire electrode and the first transparent electrode layer.

In an exemplary embodiment, when the first transparent electrode is formed, the second photoresist layer may developed and an exposed portion of the first transparent electrode layer may be etched to form the first transparent electrode extending in a first direction and arranged in parallel in a second direction crossing the first direction.

In an exemplary embodiment, the second photoresist layer remaining on the first transparent electrode may be further developed to form a spacer.

In an exemplary embodiment, the transparent electrode layer may include indium-tin-oxide ("ITO") or indium-zinc-oxide ("IZO"). The first transparent electrode layer may be dry-etched.

In an exemplary embodiment, at least one of opposing ends of the first transparent electrode may be formed on the first wire electrode. The first transparent electrode may partially overlap with the first wire electrode.

In an exemplary embodiment, in the method, a third substrate including a second wire electrode and a second transparent electrode may be assembled with the first substrate such that the second wire electrode and the second transparent electrode respectively face the first wire electrode and the first transparent electrode.

In an exemplary embodiment, the third substrate may be a first polarizer having a first polarizing axis.

In an exemplary embodiment, in the method, a second polarizer having a second polarizing axis substantially perpendicular to the first polarizing axis is formed on a fourth surface opposing the third surface of the second substrate.

In an exemplary embodiment, in the method, color filters may be formed on the second surface, and an overcoat layer may be formed on the color filters, before the common electrode is formed.

In an exemplary embodiment, when the pixel layer is formed, a switching element and a pixel electrode may be formed in a display area of the third surface of the second substrate.

In an exemplary embodiment, when the first substrate is assembled with the second substrate, a seal member is formed in a peripheral area surrounding the display area. A liquid crystal is injected into a space formed by the seal member to form a liquid crystal layer.

According to the exemplary embodiments of the display panel and the method of manufacturing the display panel, a first wire electrode of an opposite substrate is formed before the opposite substrate is assembled with an array substrate, so that cracks of the opposite substrate and the array substrate may be reduced or effectively prevented, and so the assembly of the opposite substrate and the array substrate may be stably maintained. Thus, the reliability of the display panel may be improved.

In addition, in the exemplary embodiments of the display panel and the method of manufacturing the display panel, a second photoresist layer formed on the first transparent electrode layer to pattern the first transparent electrode layer protects a first wire electrode formed earlier than the first transparent electrode and the first transparent electrode layer, so that damage to the formed first wire electrode and the first transparent electrode layer may be reduced or effectively prevented. Thus, the reliability of the display panel may be improved.

In addition, in the exemplary embodiments of the display panel and the method of manufacturing the display panel, the second photoresist layer formed on the first transparent electrode layer to pattern the first transparent electrode layer is patterned twice to form a spacer on the first transparent electrode, so that a manufacturing cost may be reduced.

BRIEF DESCRIPTION OF THE DRAWINGS

The above and other features and advantages of the invention will become more apparent by describing in detailed exemplary embodiments thereof with reference to the accompanying drawings, in which:

FIGS. 3A to 3I are cross-sectional views illustrating an exemplary embodiment of processes of manufacturing the display panel of FIG. 1.

DETAILED DESCRIPTION OF THE INVENTION

Figure 1:
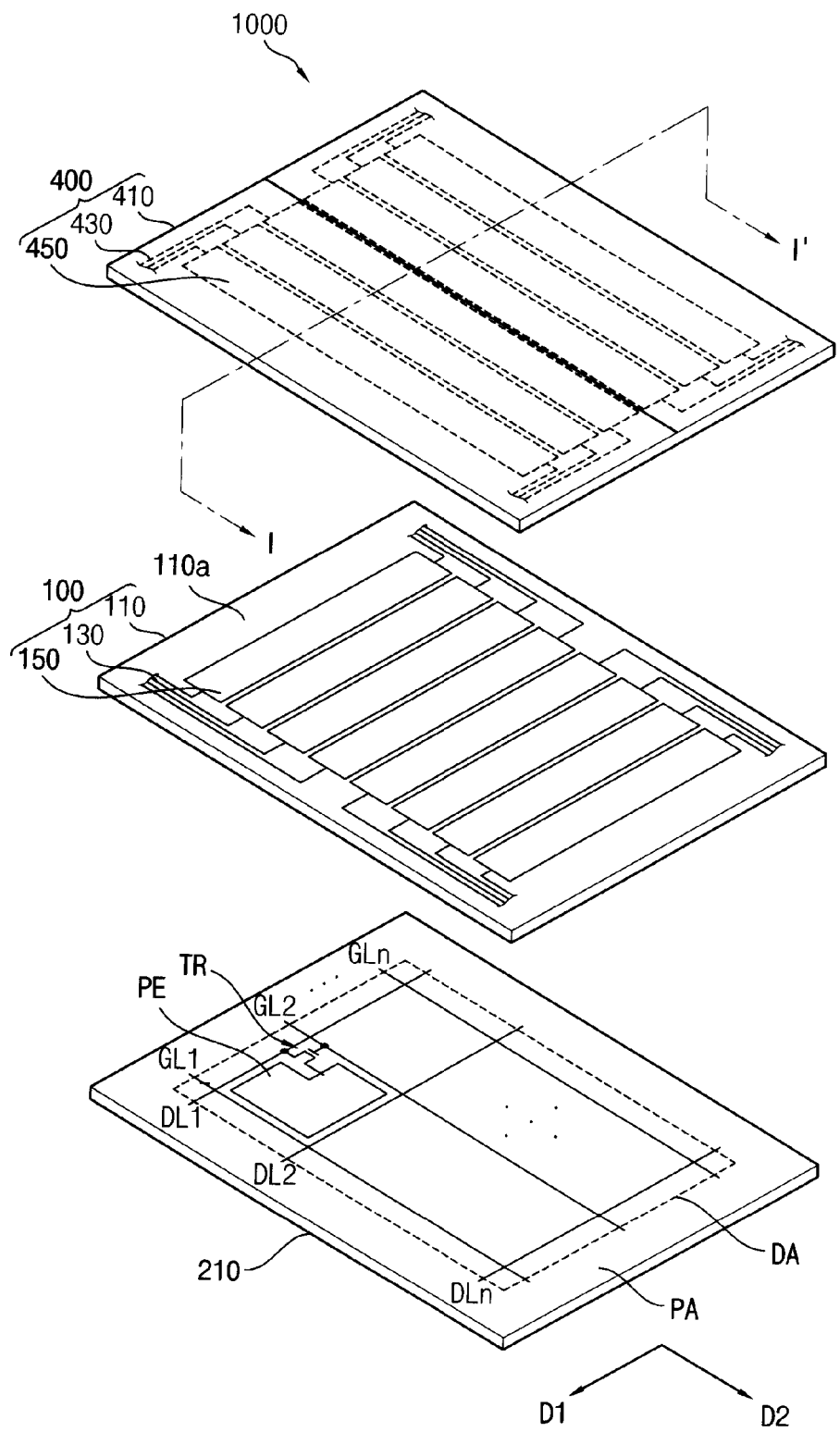
FIG. 1 is an exploded perspective view illustrating an exemplary embodiment of a display panel according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" or "lower" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
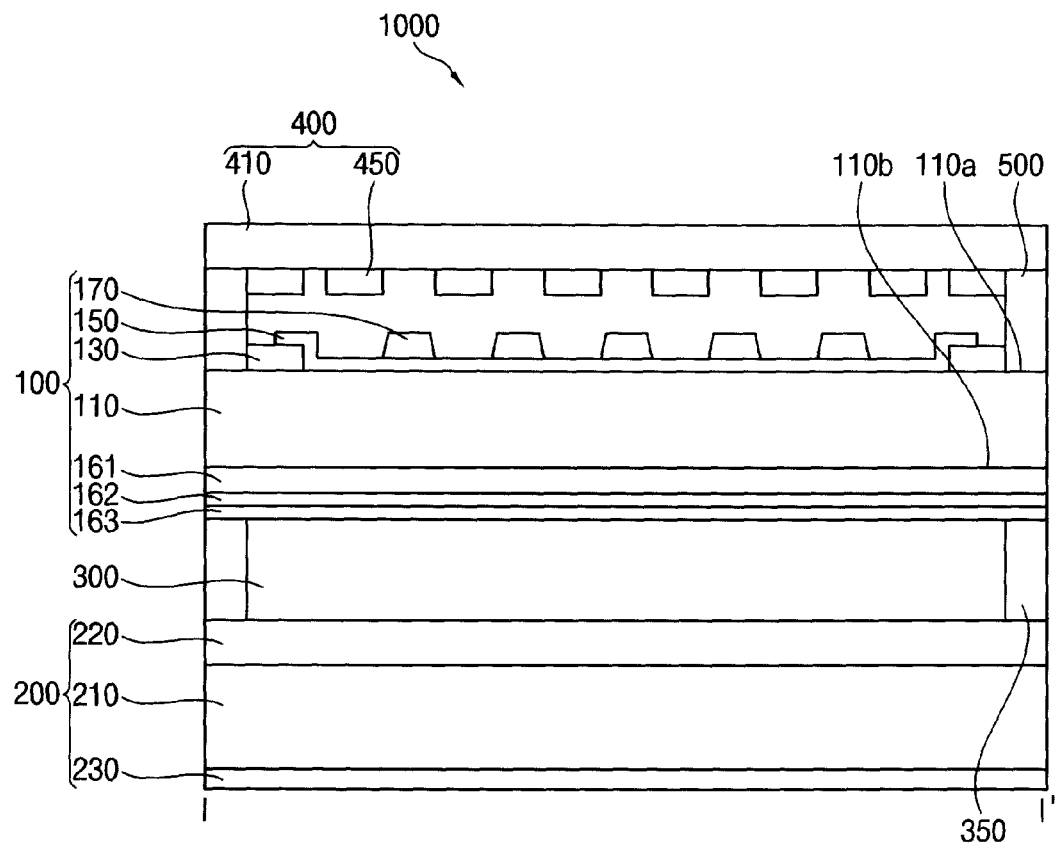
FIG. 2 is a cross-sectional view taken along line I-I' of FIG. 1.

FIG. 1 is an exploded perspective view illustrating an exemplary embodiment of a display panel according to the invention. FIG. 2 is a cross-sectional view taken along line I-I' of FIG. 1.

Referring to FIGS. 1 and 2, a display panel 1000 includes an opposite substrate 100, an array substrate 200, a liquid crystal layer 300, a seal member 350, a touch substrate 400 and an adhesive member 500.

The opposite substrate 100 includes a first substrate 110, a first wire electrode 130, a first transparent electrode 150 and a common electrode 163. The opposite substrate 100 may further include a spacer 170, color filters 161 and an overcoat layer 162.

The first substrate 110 has a first surface 110a, and a second surface 110b opposite to the first surface 100a. The first wire electrode 130 and the first transparent electrode 150 are on the first surface 110a, and the common electrode 163 is on the second surface 110b. The common electrode 163 is on the overcoat layer 162 to form a liquid crystal capacitor with a pixel electrode PE included in the array substrate 200.

The spacer 170 may be further on the first surface 110a. The color filters 161 and the overcoat layer 162 may be further on the second surface 110b. The color filters may be red, green and blue color filters. The overcoat layer 162 is on the color filters to make the second surface 110b flat. The overcoat layer 162 may include an inorganic film or an organic film.

The first wire electrode 130 is disposed in an edge area of the first surface 110a, so that a first end of the first wire electrode 130 is electrically connected to the first transparent electrode 150, and a second end of the first wire electrode 130 is electrically connected to an external device such as a printed circuit board (not shown). Thus, the first wire electrode 130 provides a current generated when the first transparent electrode 150 makes contact with a second transparent electrode 450 on the touch substrate 400, to the printed circuit board, so that the printed circuit board may detect an electrical signal. The electrical signal may include the information of a touched position in the first direction D1. The first wire electrode 130 may include a metal such as aluminum (Al), copper (Cu), etc.

The first transparent electrode 150 has a stripe shape longitudinally extending in the first direction D1. In an exemplary embodiment, the display panel 1000 may include a plurality of the first transparent electrodes 150. The first transparent electrodes 150 are arranged in parallel in the second direction D2 crossing the first direction D1. At least one of a first end and a second end of the first transparent electrode 150 opposite to each other in the first direction D1 is electrically connected to the first wire electrode 130. In one exemplary embodiment, for example, since the first transparent electrode 150 is formed on the first substrate 110 including the first wire electrode 130 after the first wire electrode 130 is formed on the first substrate 110, at least one of the first end and the second end of the first transparent electrode 150 are disposed on the first electrode 130, so that the first transparent electrode 150 may partially overlap with the first wire electrode 130. A portion of the first wire electrode 130 is between the first transparent electrode 150 and the first substrate 110 of the opposite substrate 100.

The spacer 170 may be on the first surface 110a to maintain a constant gap between the opposite substrate 100 and the touch substrate 400. Alternately, although not shown in the figures, the spacer may be on the second surface 110b to maintain a constant gap between the opposite substrate 100 and the array substrate 200.

The array substrate 200 includes a second substrate 210, a plurality of gate lines GL, a plurality of data lines DL, a switching element TR and the pixel electrode PE. The array substrate 200 may further include a spacer maintaining a constant gap between the array substrate 200 and the opposite substrate 100. The second substrate 210 may be divided into a display area DA displaying an image, and a peripheral area PA surrounding the display area DA and excluding the display area DA. In one exemplary embodiment, for example, the first transparent electrode 150 may be on the first substrate 110 corresponding to the display area DA, and the first wire electrode 130 may be on the first substrate 110 corresponding to the peripheral area PA.

The gate lines GL are longitudinally extended in the second direction D2 and arranged in parallel in the first direction D1. The data lines DL are longitudinally extended in the first direction D1 and arranged in parallel in the second direction D2.

The switching element TR is electrically connected to the gate line GL and the data line DL.

The pixel electrode PE is electrically connected to the switching element TR. The pixel electrode PE forms a liquid crystal capacitor with the common electrode 163.

The liquid crystal layer 300 is interposed between the opposite substrate 100 and the array substrate 200 to transmit or block the light provided from outside of the display panel. The seal member 350 is disposed in the peripheral area PA between the first and the second substrate 110 and 120 to assemble the first substrate 110 with the second substrate 210. The seal member 350 defines a space for receiving liquid crystal of the liquid crystal layer 300. Thus, the liquid crystal is injected or dropped in the space, so that the liquid crystal layer 300 may be formed.

The touch substrate 400 includes a third substrate 410, a second wire electrode 430 and a second transparent electrode 450.

In one exemplary embodiment, for example, the third substrate 410 may include glass, polyethylene terephthalate ("PET"), etc. Alternately, the third substrate 410 may be a first polarizer having a first polarizing axis. Thus, the array substrate 200 may further include a second polarizer 230 having a second polarizing axis substantially perpendicular to the first polarizing axis. The second polarizer 230 may be disposed under the second substrate 210.

The second wire electrode 430 is disposed in an edge area of the third substrate 410, so that a first end of the second wire electrode 430 is electrically connected to the second transparent electrode 450, and a second end of the second electrode 430 is electrically connected to the external device such as the printed circuit board (not shown). Thus, the second wire electrode 430 provides a current generated when the second transparent electrode 450 makes contact with the first transparent electrode 150 to the printed circuit board, so that the printed circuit board may detect an electrical signal. The electrical signal may include the information of a touched position in the second direction D2. The second wire electrode 430 may include aluminum (Al), copper (Cu), etc.

The second transparent electrode 450 has a stripe shape longitudinally extending in the second direction D2. In an exemplary embodiment, the display panel 1000 includes a plurality of the second transparent electrodes 450. The second transparent electrodes 450 are arranged in parallel in the first direction D1. In one exemplary embodiment, for example, at least one of a first end and a second end of the second transparent electrode 450 opposite to each other in the second direction D2 is electrically connected to the second wire electrode 430. In one exemplary embodiment, for example, at least one of the first end and the second end of the second transparent electrode 450 is disposed on the third substrate 410 including the second wire electrode 430 after the second wire electrode 430 is disposed on the third substrate 410, so that the second transparent electrode 450 may partially overlap with the second wire electrode 430. Alternately, at least one of the first and the second end of the second transparent electrode 450 is disposed under the second wire electrode 430, so that the second transparent electrode 450 may partially overlap with the second wire electrode 430.

In the illustrated embodiment, for example, since the touch substrate 400 is assembled with the opposite substrate 100 after all of the first wire electrode 130, the first transparent electrode 150 and the common electrode 163 are formed on the first substrate 110, and the opposite substrate 100 is assembled with the array substrate 200, the second wire electrode 430 may be formed on the third substrate 410 before the second transparent electrode 450 is formed on the third substrate 410, or the second wire electrode 430 may be formed on the third substrate 410 after the second transparent electrode 450 is formed on the third substrate 410.

The adhesive member 500 is disposed in an edge area between the first and the third substrates 110 and 410 to assemble the first substrate 110 with the third substrate 410.

FIGS. 3A to 3I are cross-sectional views illustrating an exemplary embodiment of processes of manufacturing the display panel of FIG. 1.

Figure 3A:
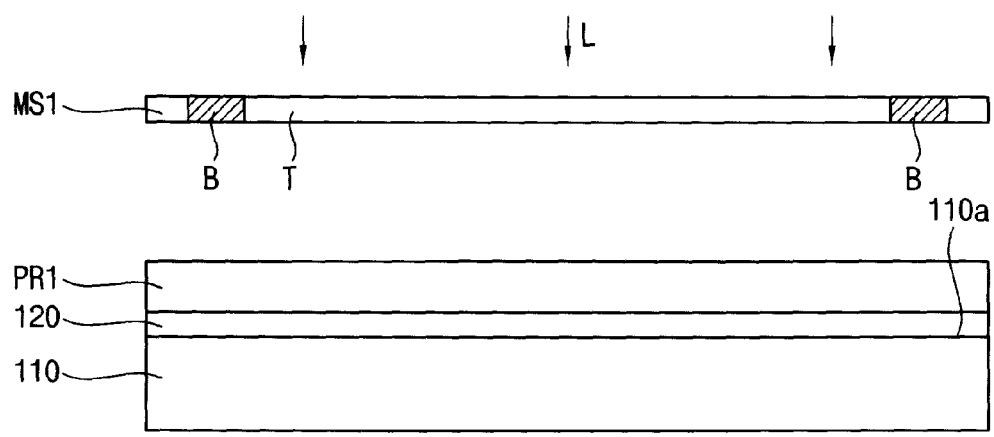

Referring to FIG. 3A, a first wire electrode layer 120 and a first photoresist layer PR1 are sequentially formed on the first surface 110a of the first substrate 110.

The wire electrode layer 120 includes a metal such as aluminium (Al), copper (Cu), etc. The first photoresist layer PR1 is formed via a spin coating method or a slit coating method.

A first mask MS1 having a transmissive portion T and a blocking portion B is disposed over the first substrate 110. In one exemplary embodiment, for example, when the first photoresist layer PR1 is a positive type, the light L is provided to the first photoresist layer PR1 through the first mask MS1 having the blocking portion B corresponding to the first wire electrode 130, and then the first photoresist layer PR1 is exposed and developed. Thus, an exposed portion of the first photoresist layer PR1 is removed. However, when the first photoresist layer PR1 is a negative type, the light L is provided to the first photoresist layer PR1 through the first mask MS1 having the transmissive portion T corresponding to the first wire electrode 130, and then the first photoresist layer PR1 is exposed and developed. Thus, the exposed portion of the first photoresist layer PR1 remains.

Figure 3B:
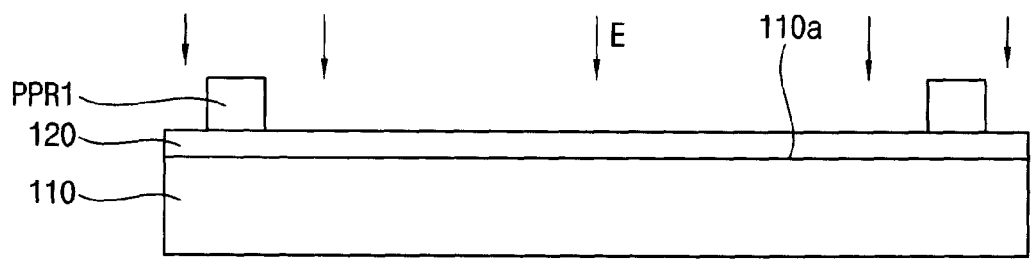
Figure 3C:
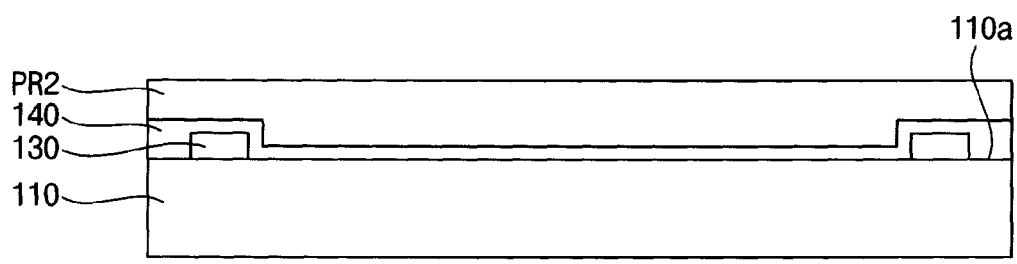

Referring to FIGS. 3B and 3C, the first photoresist layer PR1 is developed, so that a first photo pattern PPR1 corresponding to the first wire electrode 130 remains.

Then, an exposed first wire electrode layer 120 except for the first wire electrode layer 120 corresponding to (e.g., overlapping or aligned with) the first photo pattern PPR1 is etched using the first photo pattern PPR1 as an etch stopper. In one exemplary embodiment, for example, since the first wire electrode layer 120 includes a metal such as Al, Cu, etc, the first wire electrode layer 120 is patterned via a wet-etching process using the etchant E including fluorine (F), etc. The first wire electrode layer 120 is patterned, so that the first wire electrode 130 is formed. Then, the first photo pattern PPR1 disposed on the first wire electrode 130 is removed by a stripper.

According to the illustrated exemplary embodiment, the first wire electrode layer 120 is wet-etched before the first substrate 110 is assembled with the second substrate 210 as described hereinafter, so that the cracks due to a difference of thermal expansions of the first substrate 110 and the second substrate 210 may be reduced or effectively prevented, and damage of the seal member 350 may be reduced or effectively prevented. In addition, a process of forming a dummy seal member is unnecessary, so that a manufacturing cost may be reduced.

Then, a first transparent electrode layer 140 and a second photoresist layer PR2 are sequentially formed on the first surface 110a of the first substrate 110 having the first wire electrode 120.

The first transparent layer 140 includes indium-tin-oxide ("ITO"), indium-zinc-oxide ("IZO"), etc. The second photoresist layer PR2 is formed in the spin coating method or a slit coating method.

Figure 3D:
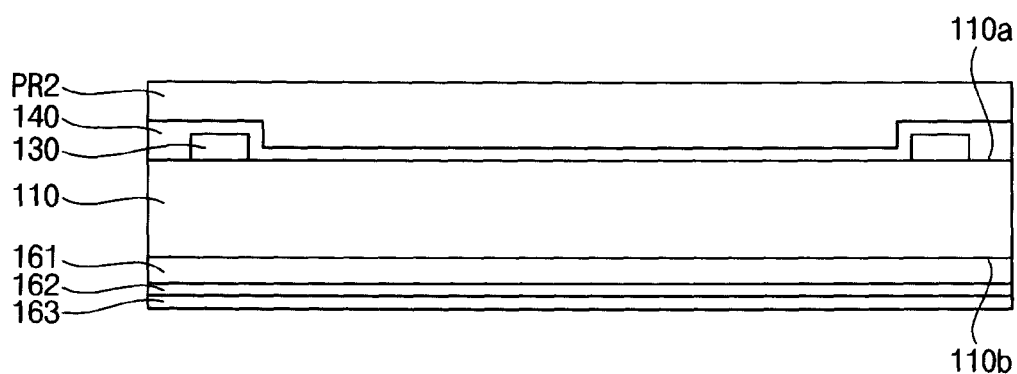

Referring to FIG. 3D, the color filters 161, the overcoat layer 162 and the common electrode 163 are sequentially formed on the second surface 110b of the first substrate 110. The first transparent layer 140 and the second photoresist layer PR2 are formed on the first surface 110a of the first substrate 110. The color filters 161 include a red color filter, a green color filter and a blue color filter. The overcoat layer 162 is disposed on the color filters 161 and makes an uneven surface flat. The common electrode 163 is disposed on the overcoat layer 162 and forms a terminal of a liquid crystal capacitor.

Figure 3E:
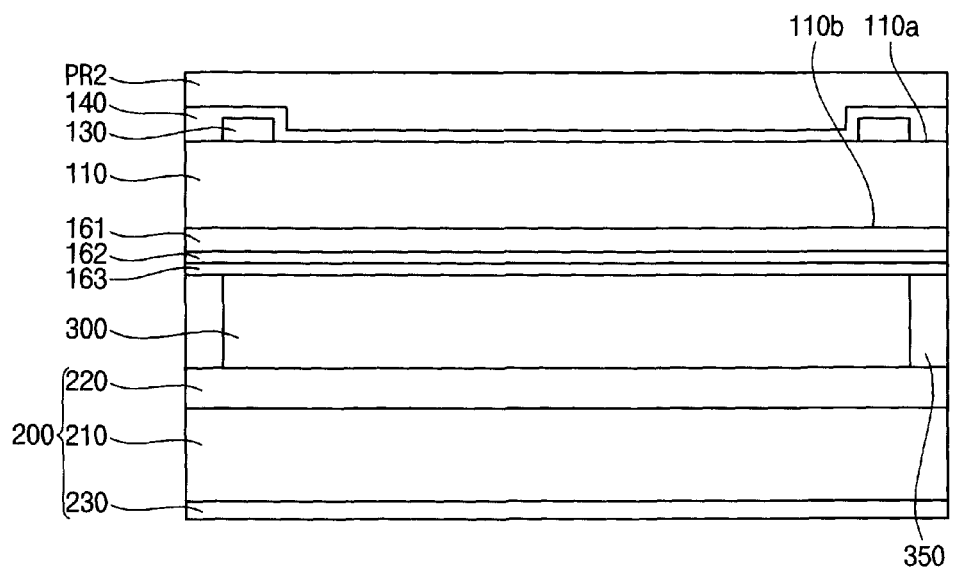

Referring to FIG. 3E, the first substrate 110 having the color filters 161, the overcoat layer 162 and the common electrode layer 163 formed on the second surface 110b of the first substrate 110 is assembled with the array substrate 200 including pixel layer 220 using the seal member 350.

In this case, the second photoresist layer PR2 is a protecting layer, so that the second photoresist layer PR2 may prevent a scratch, etc., from being generated in the first wire electrode 130 and the first transparent electrode layer 140 when the first substrate 110 is assembled with the array substrate 200.

A gate electrode, a semiconductor pattern, a source electrode and a drain electrode of the switching element TR, and the pixel electrode PE electrically connected to the switching element TR are formed on the second substrate 210, although not shown in figures, so that the array substrate 200 is formed.

When the first substrate 110 is assembled with the array substrate 200, the seal member 350 is formed in a peripheral area of one of the first substrate 110 and the second substrate 210. Thus, the first substrate 110 is assembled with the second substrate 210 of the array substrate 200 by the seal member 350. Then, the liquid crystal is injected into a space defined by the seal member 350 to form the liquid crystal layer 300. Alternately, the liquid crystal may be dropped in a space defined by the seal member 350 to form the liquid crystal layer 300 before the first substrate 110 is assembled with the second substrate 210.

Figure 3F:
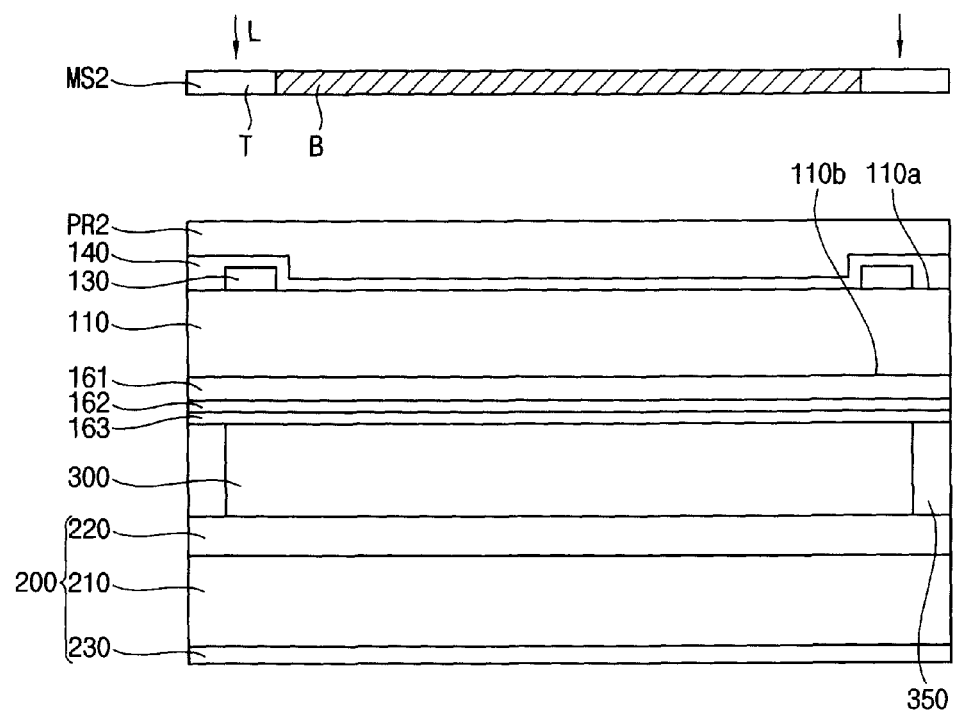

Referring FIG. 3F, a second mask MS2 having a transmissive portion T and a blocking portion B is disposed facing the first surface 110a of the first substrate 110 assembled with the array substrate 200. In one exemplary embodiment, for example, when the second photoresist layer PR2 is a positive type, the light L may be provided to the second photoresist layer PR2 through the blocking portion B of the second mask MS2 corresponding to the first transparent electrode 150, and then the second photoresist layer PR2 may be exposed and developed. Thus, an exposed portion of the second photoresist layer PR2 is removed. However, when the second photoresist layer PR2 is a negative type, the light L may be provided to the second photoresist layer PR2 through the second mask MS2 having the transmissive portion T corresponding to the first transparent electrode 150, and then the second photoresist layer PR2 may be exposed and developed. Thus, the exposed portion of the second photoresist layer PR2 remains.

Figure 3G:
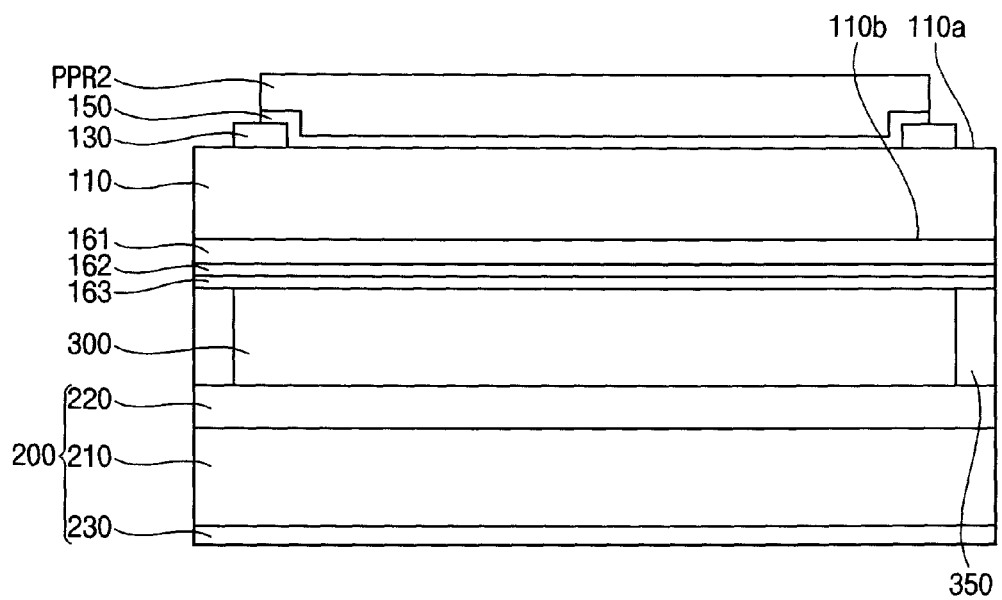

Referring to FIG. 3G, the second photoresist layer PR2 is developed, so that a second photo pattern PPR2 corresponding to the first transparent electrode 150 remains.

Then, an exposed first transparent electrode layer 140 except for the first transparent electrode layer 140 corresponding to the second photo pattern PPR2 is etched using the second photo pattern PPR2 as an etch stopper. In one embodiment, for example, since the first transparent electrode layer 140 includes ITO, IZO, etc, the first transparent electrode layer 140 is patterned via a dry-etching process. The second photo pattern PPR2 partially overlaps with the first wire electrode 130.

The first transparent electrode layer 140 is patterned, so that the first transparent electrode 150 is formed. The first transparent electrode 150 is formed on the first substrate 110 on which the first wire electrode 130 is formed, to partially overlap with the first wire electrode 130. Thus, the first transparent electrode 150 is electrically connected to the first wire electrode 130. Therefore, the first wire electrode 130 provides a current provided from the first transparent electrode 150 to the external device such as a printed circuit board, etc.

Figure 3H:
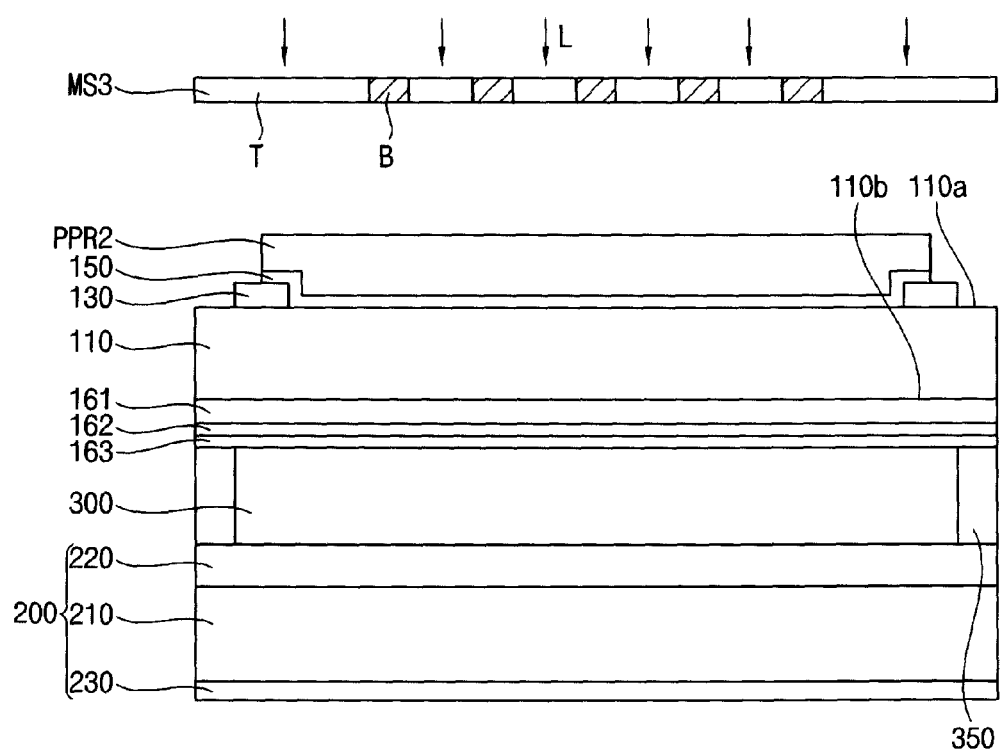
Figure 31:
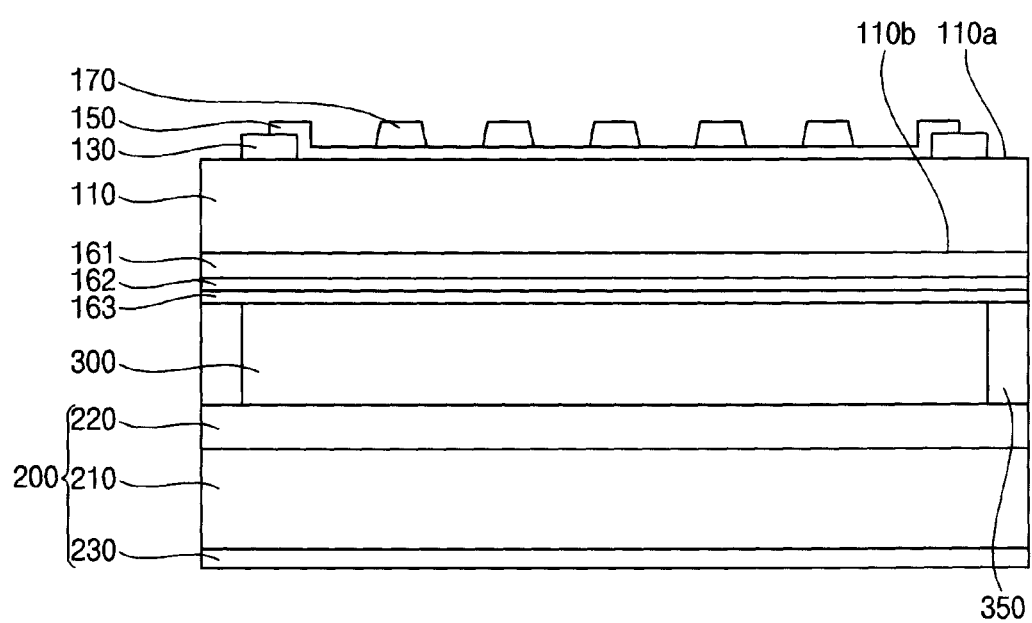

Referring to FIG. 3H, a third mask MS3 having a transmissive portion T and a blocking portion B is disposed over the first surface 110a of the first substrate 110 on which the first transparent electrode 150, and the second photo pattern PPR2 remaining on the first transparent electrode 150, are formed.

In one exemplary embodiment, for example, when the second photo pattern PPR2 is a positive type, the light L may be provided to the second photo pattern PPR2 through the third mask MS3 having the blocking portion B corresponding to the spacer 170, and then the second photo pattern PPR2 may be exposed and developed. Thus, an exposed portion of the second photo pattern PPR2 is removed. However, when the second photo pattern PPR2 is a negative type, the light may be provided to the second photo pattern PPR2 through the third mask MS3 having the transmissive portion T corresponding to the spacer 170, and then the second photo pattern PPR2 may be exposed and developed. Thus, the exposed portion of the second photo pattern PPR2 remains.

Referring to FIG. 3I, the second photo pattern PPR2 is developed by the third mask MS3, so that the spacer 170 is formed. In one exemplary embodiment, for example, the second photo pattern PPR2 is not removed by the stripper, and the photo pattern PPR2 is re-patterned by the third mask MS3, so that the spacer 170 maintaining a constant gap between the first transparent electrode 150 and the second transparent electrode 450 is formed.

Referring to FIG. 2, the adhesive member 500 is formed in the edge area of the opposite substrate 100 including the first substrate 110 on which the spacer 170 is formed. Then, the opposite substrate 100 on which the adhesive member 500 is formed is assembled with the touch substrate 400 including the third substrate 410 on which the second wire electrode 430 and the second transparent electrode 450 are formed.

In one exemplary embodiment, for example, the second transparent electrode 450 of the touch substrate 400 may be formed after the second wire electrode 430 is formed, like the first transparent electrode 150 after the first wire electrode 130 of the opposite substrate 100 in the illustrated exemplary embodiment. Alternately, the second transparent electrode 450 of the touch substrate 400 may be formed before the second wire electrode 430 is formed.

According to the illustrated exemplary embodiment, the first wire electrode 130 is formed on the first surface 100a of the opposite substrate 100 before the opposite substrate 100 is assembled with the array substrate 200, so that the cracks due to a difference between thermal expansions of the first substrate 110 of the opposite substrate 100 and the second substrate 210 of the array substrate 200 may be reduced or effectively prevented, and a damage of the seal member 350 may be reduced or effectively prevented. Thus, leaking of the liquid crystal may be reduced or effectively prevented.

According to the invention, a first wire electrode of an opposite substrate is formed before the opposite substrate is assembled with an array substrate, so that cracks of the opposite substrate and the array substrate may be reduced or effectively prevented, and the assembly of the opposite substrate and the array substrate may be stably maintained. Thus, reliability of the display panel may be improved.

In addition, a second photoresist layer formed on the first transparent electrode layer to pattern the first transparent electrode layer, protects a final first wire electrode earlier formed than the first transparent electrode and the first transparent electrode layer, so that a scratch of the final first wire electrode and the first transparent electrode layer may be reduced or effectively prevented. Thus, the reliability of the display panel may be improved.

In addition, the second photoresist layer formed on the first transparent electrode layer to pattern the first transparent electrode layer is patterned twice to form a spacer on the first transparent electrode, so that a manufacturing cost may be reduced.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of manufacturing a display panel, the method comprising:
   forming a first wire electrode on a first surface of a first substrate;
   forming a common electrode on a second surface opposite to the first surface, of the first substrate;
   forming a pixel layer on a third surface of a second substrate;

assembling the first substrate with the formed first wire and common electrodes thereon, with the second substrate, such that the third surface of the second substrate faces the second surface of the first substrate; and forming a first transparent electrode on the first surface of the first substrate and partially overlapping with the first wire electrode on the first substrate, after the assembling the first substrate including the formed first wire electrode thereon, with the second substrate.

2. The method of claim 1, wherein the forming the first wire electrode comprises:

sequentially forming a wire electrode layer and a first photoresist layer on the first surface; and developing the first photoresist layer and etching an exposed portion of the wire electrode layer to form the first wire electrode.

3. The method of claim 2, wherein
the first wire electrode includes one of aluminum (Al) and copper (Cu), and
the exposed portion of the wire electrode layer is wet-etched.

4. The method of claim 2, further comprising:
sequentially forming a first transparent electrode layer and a second photoresist layer on the first surface after the forming the first wire electrode, and before the forming the common electrode.

5. The method of claim 4, wherein the second photoresist layer overlaps the first wire electrode and the first transparent electrode layer.

6. The method of claim 4, wherein the forming the first transparent electrode comprises:

developing the second photoresist layer and etching an exposed portion of the first transparent electrode layer to form the first transparent electrode extending in a first direction and arranged in a second direction crossing the first direction.

7. The method of claim 6, further comprising:
forming a spacer on the first transparent electrode after the forming the first transparent electrode, by further developing the second photoresist layer remaining on the first transparent electrode.

8. The method of claim 4, wherein
the transparent electrode layer includes indium-tin-oxide or indium-zinc-oxide, and
the first transparent electrode layer is dry-etched.

9. The method of claim 4, wherein at least one of opposing ends of the first transparent electrode is formed on the first wire electrode, and the first transparent electrode partially overlaps with the first wire electrode.

10. The method of claim 1, further comprising:
assembling a third substrate including a second wire electrode and a second transparent electrode with the first substrate, such that the second wire electrode and the second transparent electrode respectively face the first wire electrode and the first transparent electrode of the first substrate.

11. The method of claim 10, wherein the third substrate is a first polarizer having a first polarizing axis.

12. The method of claim 11, further comprising:
forming a second polarizer having a second polarizing axis substantially perpendicular to the first polarizing axis, on a fourth surface opposing the third surface of the second substrate.

13. The method of claim 1, further comprising:
forming color filters on the second surface of the first substrate; and
forming an overcoat layer on the color filters, before the forming a common electrode.

14. The method of claim 1, wherein the forming a pixel layer comprises:
forming a switching element and a pixel electrode in a display area of the third surface of the second substrate.

15. The method of claim 14, wherein the assembling the first substrate with the second substrate comprises:
forming a seal member in a peripheral area surrounding the display area; and
forming a liquid crystal layer by injecting a liquid crystal to a space formed by the seal member.

* * * * *